United States Patent [19]
Shao et al.

[11] Patent Number: 6,010,629
[45] Date of Patent: *Jan. 4, 2000

[54] *MICROTHRIX PARVICELLA* FORMING AND BULKING CONTROLLING METHOD FOR WASTE WATER TREATMENT

[76] Inventors: Y. J. Shao, 4824 Hollow Corner Rd., 260 Culver City, Calif. 90230; Konstadinos Kaporis, 4581 Finley Ave. #8, Los Angeles, Calif. 90027

[*] Notice: This patent is subject to a terminal disclaimer.

[21] Appl. No.: 09/012,423

[22] Filed: Jan. 23, 1998

[51] Int. Cl.$^7$ ........................................ C02F 3/12
[52] U.S. Cl. .................... 210/608; 210/611; 210/626; 210/631
[58] Field of Search ................... 210/608, 614, 210/626, 631, 732–736, 611

[56] References Cited

U.S. PATENT DOCUMENTS

| | | | |
|---|---|---|---|
| 3,622,508 | 11/1971 | Komline | 210/608 |
| 3,658,697 | 4/1972 | Huether | 210/631 |
| 4,173,532 | 11/1979 | Keoteklian | 210/631 |
| 5,240,600 | 8/1993 | Wong et al. | 210/631 |
| 5,364,529 | 11/1994 | Morin et al. | 210/608 |
| 5,614,098 | 3/1997 | Shao et al. | 210/608 |

*Primary Examiner*—Thomas G. Wyse
*Attorney, Agent, or Firm*—Raymond Y. Chan; David and Raymond

[57] ABSTRACT

A *Microthrix parvicella* (and other microorganisms) foaming controlling method of waste water treatment includes a step of injecting polymer to the aeration basins of an industrial or domestic waste water activated sludge treatment systems. When polymer is present in the aeration basin it reduces the buoyancy of the *Microthrix parvicella*, most likely by reducing the cell surface hydrophobicity or by coagulation and flocculation of the *Microthrix parvicella* (and other microorganisms) floc. This allows foam causing microorganisms to escape the treatment system.

17 Claims, 4 Drawing Sheets

MICROTHRIX PARVICELLA FORMING AND BULKING CONTROLLING METHOD FOR WASTE WATER TREATMENT

FIELD OF THE PRESENT INVENTION

The present invention relates to waste water treatment, and more particularly to a microorganism such as *Microthrix parvicella* foaming and bulking control method of a waste water treatment which is a solution to the foaming and bulking problems by controlling *Microthrix parvicella* and other microorganisms populations.

BACKGROUND OF THE PRESENT INVENTION

Bulking and foaming of activated sludge in waste water treatment due to proliferation of *Microthrix parvicella* and other microorganisms is one of the greatest operational problems facing biological, and especially nutrient removal, waste water treatment plants. Because of the microorganisms' cell surface hydrophobicity (CSH), these microorganisms have been known to float in the surfaces of the treatment tanks.

The biggest problem is the production of a brown, viscous foam. Due to the tenacious nature of the foam, serious problems can develop as foam accumulates. The foaming can create safety hazards, deteriorate effluent quality, and be a source of odors. Furthermore since this type of foaming is associated with cold winter temperatures, the stabilized foam layer may freeze and may cause operational problems. Excessive bulking, or the weakness of the solids to settle, can also occur in the settling tanks, due to the presence of *Microthrix parvicella* and other filamentous microorganisms.

Though the causes of this type of foam causing microorganisms' growth are not very well defined, it is commonly associated with colder climates, long solids retention time (SRT), and the presence of lipids and fatty acids that are used for the microorganism's carbon source.

Existing foaming control methods may be successful in alleviating some of the symptoms, but generally, there are no quick solution and high foaming level can linger for months. Furthermore some suggested methods for foam control can result in inadequate treatment, and deteriorate effluent quality. Chemical anti-foaming agents used to suppress foaming are usually not effective in the long term. Disinfectant (typically chlorine solution) applied to the return activated sludge (RAS) for bulking control, is not always successful in controlling these microorganisms.

*Microthrix parvicella* or other microorganisms foaming is most prevalent in activated sludge type of treatment plants especially nutrient removal plants. Conventional activated sludge treatment plants consists of bar screening, aerated grit removal, primary sedimentation, and activated sludge biological treatment. The sludge collected in these processes is then typically anaerobically digested and dewatered. FIG. 1 is a schematic of typical activated sludge treatment plant for which this invention is most applicable to.

Once foam causing microorganisms has been established in a conventional activated sludge plant control options have had limited success. Because of the hydrophobic nature of these microorganisms they float at the top of aeration basins and thus they are often trapped in the basins since outlets are submerged.

SUMMARY OF THE PRESENT INVENTION

The main object of the present invention is to provide a *Microthrix parvicella* (or other microorganisms) foaming and bulking control method of a waste water treatment which is a solution to the foaming and bulking problems, most probably by reducing the cell surface hydrophobicity (CSH) of the microorganism floc and coagulating this floc. This allows the microorganisms to pass through the aeration basins to eventually escape the sludge treatment system.

DETAILED DESCRIPTION OF THE PREFERRED EMBODIMENT

Figure 1:
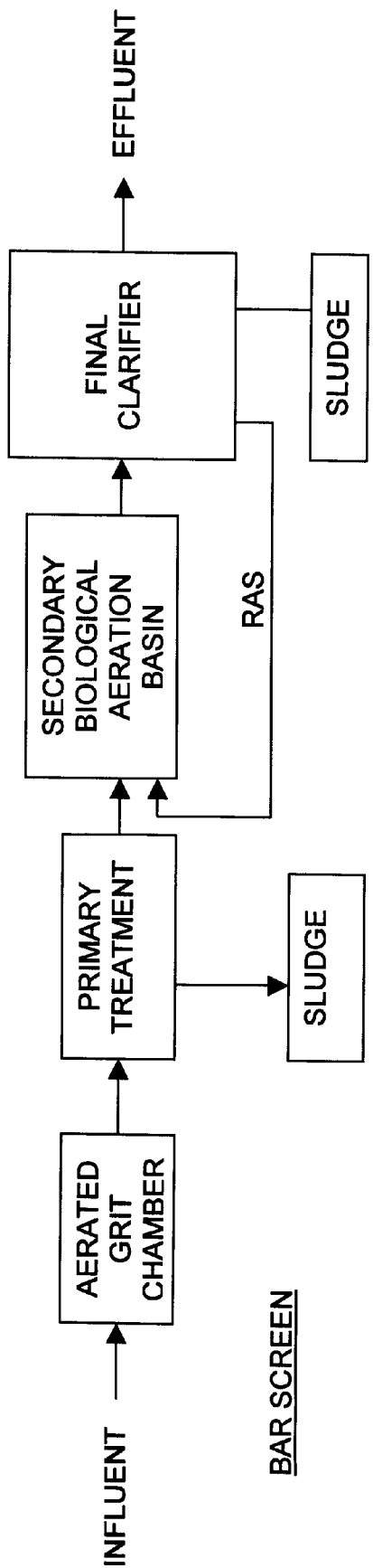
FIG. 1 is a schematic view of the conventional activated sludge waste water treatment process for which this invention is most applicable.
Figure 2:
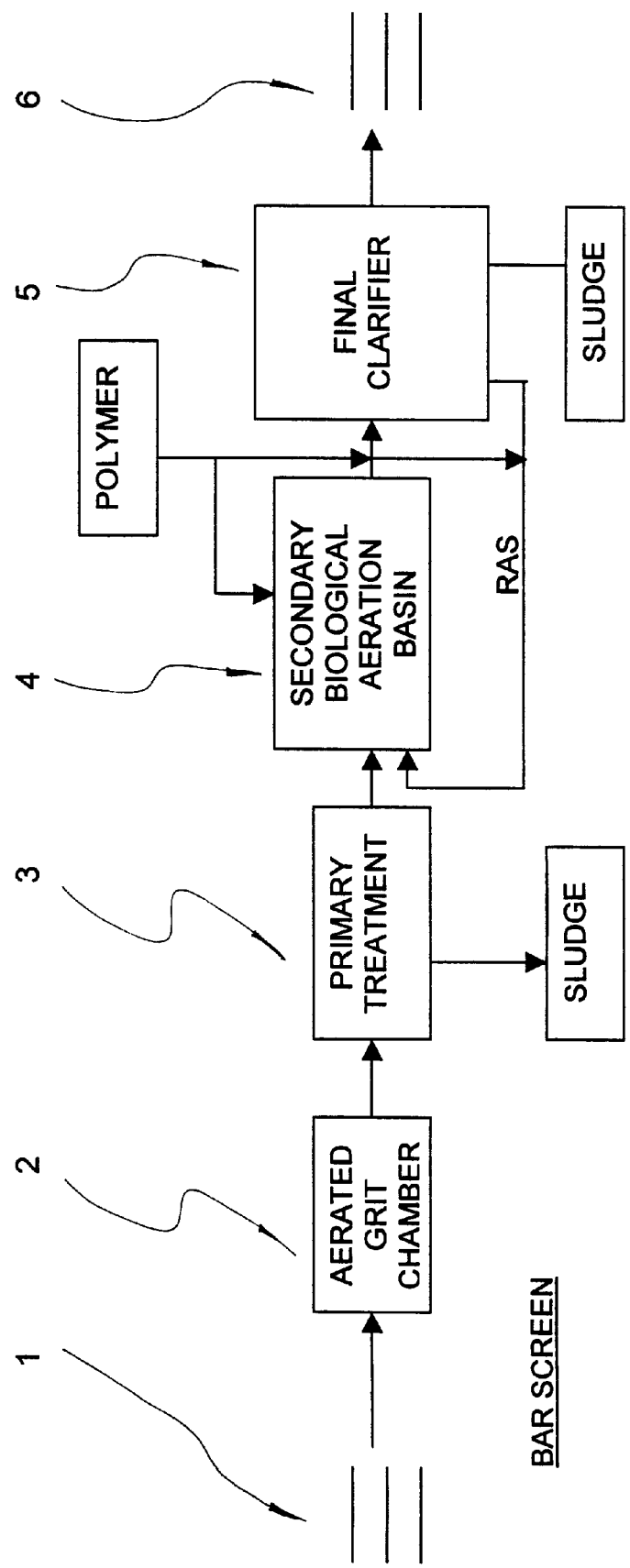
FIG. 2 is a schematic view of a typical waste water treatment process utilizing a Microthrix Parvicella (or other microorganisms) foaming and bulking controlling method of a preferred embodiment according to the present invention.

Referring to FIG. 2, a *Microthrix parvicella* (or other microorganisms) foaming and bulking controlling method of waste water treatment according to the present invention comprises of the following steps.

Treat the waste water influent with a bar screens 1 or the similar device to rid of objects of large sizes present in the waste water system stream.

The waste water coming through the bar screening stage is passed to a predetermined number of aerated grit removal chamber 2 where heavy materials are removed from the waste water stream.

The waste water coming out of the aerated grit removal chamber 2 is treated with a primary sedimentation 3 by which most suspended solids are separated out.

The waste water treat coming out of the primary sedimentation 3 is passed to a predetermined number of secondary aeration basin(s) 4 for biological aeration process wherein activated sludge is introduced.

Polymer is injected or added into the secondary aeration basin 4. The polymer may be injected or added at a return activated sludge (RAS) line that controls microorganisms such as *Microthrix parvicella* foaming. The polymer may also be injected or added in the head or the surface of the aeration basin 4, or mixed liquor coming out of the secondary aeration basin(s) 4.

The waste water stream after the injection or addition of the polymer is passed to a predetermined number of clarifier 5 for settling treatment to achieve a treated effluent 6. It should be noted that the addition of the polymer must be operated before the waste water stream enters into the clarifier 5.

The polymer is added or recycled to the aeration basin 4. The presence of polymer in the aeration basin 4 causes foam causing microorganisms such as *Microthrix parvicella* to lose its hydrophobicity or coagulating and defoaming effect can be achieved.

The reduction in foaming is monitored by recording the percentage of area covered by foaming. At the same time foam-causing-microorganism concentrations counting is conducted by counting the filaments' hairs intercepting the eyepiece line of the microscope.

Figure 3:
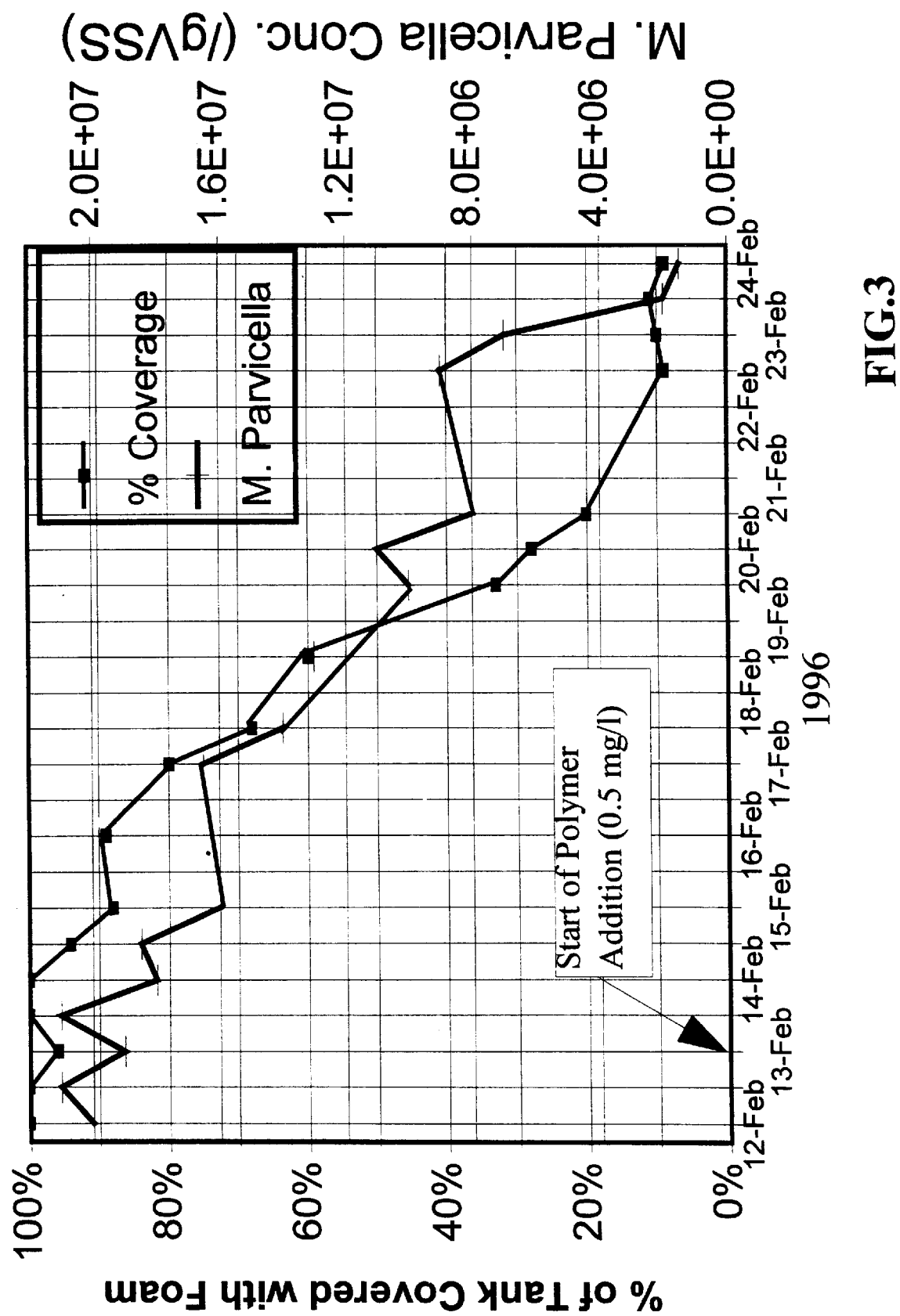
FIG. 3 is a graphic view illustrating the impact of polymer on foaming, of the above embodiment of the present invention, showing the effect of polymer on *Microthrix parvicella* foam.

FIG. 3 summarizes the readings of the *Microthrix parvicella* counting and foaming levels during a bench scale test. As the eyepiece line been seen from the graph there was no immediate reaction of the foaming levels to polymer addition. However few hours later the drop is noteworthy both in the foaming levels, and the concentrations of the *Microthrix parvicella*. By the completion of the test, two weeks later, the foam had virtually disappeared, while the concentration of *Microthrix parvicella* dropped to relatively low levels.

Foaming is the collection of interfaces separated by air bubbles. In the case of *Microthrix parvicella* foaming, a surface tension is created between the air bubbles and the floc containing *Microthrix parvicella* bacteria that tends to stabilize foams. The term hydrophilic used to describe *Microthrix parvicella* is misleading because it's air entrapment that forces *Microthrix parvicella* to float. In this case *Microthrix parvicella* bacteria get trapped because of the submerged aeration basins outlets.

One possible explanation of effect of polymer to control foaming can be found in the hydrophilic nature of polymer. The mechanism that is used is the ability of the long-haired charged polymers to destabilize colloids by forming a bridge between one colloid and another. Most likely, in their interaction with foaming floc polymers have the ability to lower the surface tension developed between foaming microorganisms and air bubbles that plays the main role in the controlling foaming. Alternatively, polymer may have this effect on foaming by coagulating and flocculating the floc of the microorganisms.

According to the present invention the polymer dose of 0.01 to 10 ppm is the most effective foam control dosage.

A way of exploring the effectiveness of polymer as a *Microthrix parvicella* (or other microorganisms) foaming and bulking control agent by the industry, is described in the following with reference to FIG. 4.

1. Polymer addition should be considered as a foaming control option.
2. Before the installation of any permanent injection lines, polymer should be tried on a temporary basis.
3. FIG. 4, shows the proposed polymer injection system. It should be noted that the polymer is injected at the RAS line. Several injection points including the mixed liquor channel, the head-end of the aeration basins, or spraying on top of the aeration basins should be considered.

Figure 4:
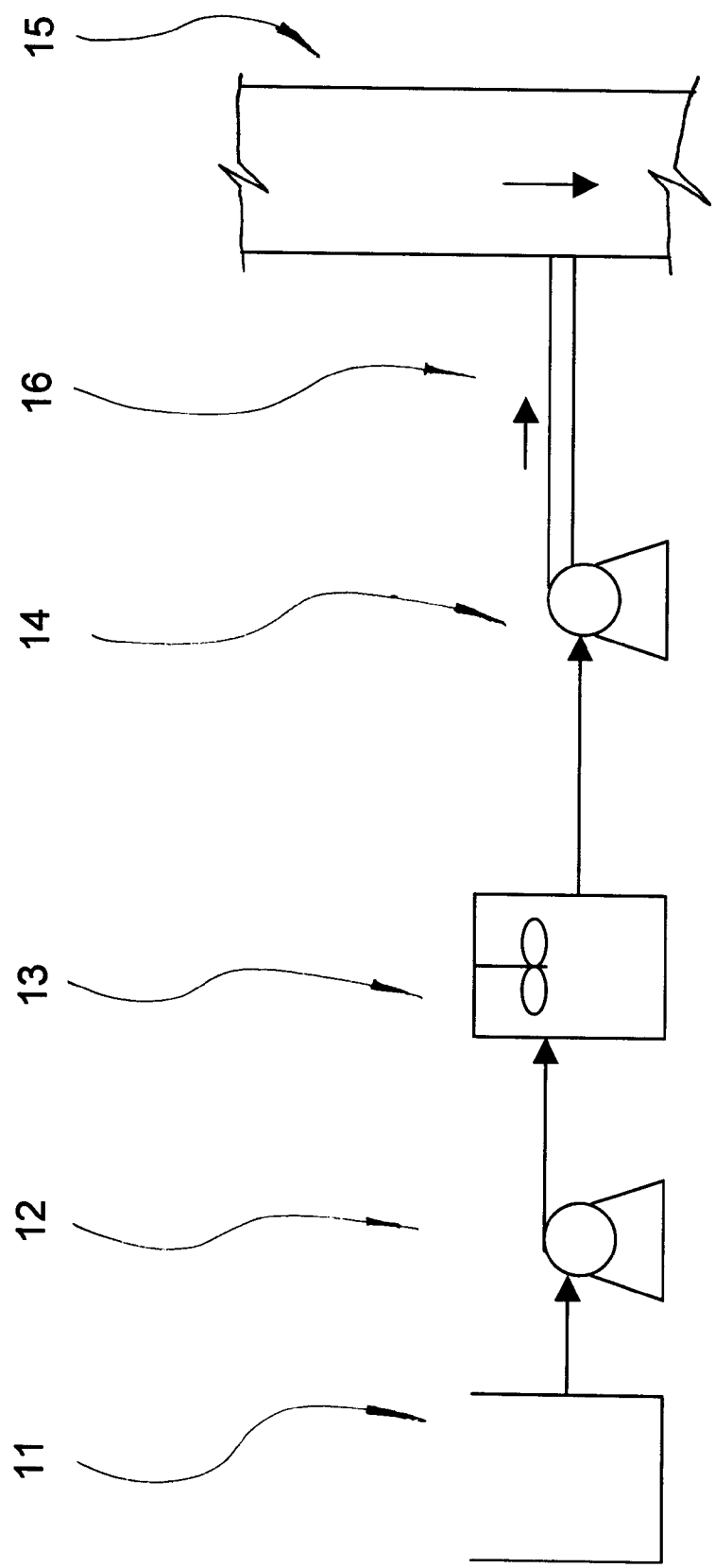
FIG. 4 is a schematic view of a polymer injection line of the above embodiment of the present invention.

Referring to FIG. 4, the polymer injection line comprises a polymer tank 11 which stores the polymer raw material, a mixing pump for pumping the polymer out of the tank, a mixing tank 13 in which the polymer is mixed and stored therein, a dosing pump 14 for making dose of polymer with 0.01 ppm to 10 ppm and injecting to a Return Activated Sludge (RAS) line 15 of the waste water treatment system through a pipe 16.

What is claimed is:

1. A microorganism foaming and bulking controlling method for waste water treatment, comprising the steps of:

treating an industrial or domestic waste water that contains foam causing microorganisms, including *Microthrix parvicella*, by an activated sludge treatment process, wherein said activated sludge treatment process comprises the steps of:

(a) treating said waste water with a primary sedimentation by which most suspended solids are separated out;

(b) passing said waste water after the treatment of said primary sedimentation to at least one secondary aeration basin for biological aeration process wherein activated sludge is introduced;

(c) passing said waste water coming out of said secondary aeration basin to at least one clarifier for clarifying treatment to produce effluent of clean water;

injecting or adding a polymer in said waste water before said waste water entering into said clarifier and after coming out from said primary sedimentation; and removing said foam causing microorganisms from said aeration basin by the presence of said polymer in said aeration basin, wherein said foam causing microorganism floc loses buoyancy thereof and escapes said aeration basin, whereby a defoaming effect is achieved.

2. A microorganism foaming and bulking controlling method for waste water treatment, as recited in claim 1, further comprising an additional step of recycling said activated sludge from said clarifier to said aeration basin through a Return Activated Sludge (RAS) line.

3. A microorganism foaming and bulking controlling method for waste water treatment, as recited in claim 2, wherein said polymer is injected or added into said waster water coming out of said aeration basin and before entering into said clarifier through said Return Activated Sludge (RAS) line to control microorganism foaming.

4. A microorganism foaming and bulking controlling method for waste water treatment, as recited in claim 1, wherein said polymer is injected or added in said aeration basin.

5. A microorganism foaming and bulking controlling method for waste water treatment, as recited in claim 2, wherein said polymer is also injected or added in said aeration basin.

6. A microorganism foaming and bulking controlling method for waste water treatment, as recited in claim 3, wherein said polymer is also injected or added in said aeration basin.

7. A microorganism foaming and bulking controlling method for waste water treatment, as recited in claim 2, wherein said polymer is injected or added at said Return Activated Sludge (RAS) line.

8. A microorganism foaming and bulking controlling method for waste water treatment, as recited in claim 1, wherein said polymer has a dose of 0.01 ppm to 10 ppm.

9. A microorganism foaming and bulking controlling method for waste water treatment, as recited in claim 2, wherein said polymer has a dose of 0.01 ppm to 10 ppm.

10. A microorganism foaming and bulking controlling method for waste water treatment, as recited in claim 3, wherein said polymer has a dose of 0.01 ppm to 10 ppm.

11. A microorganism foaming and bulking controlling method for waste water treatment, as recited in claim 4, wherein said polymer has a dose of 0.01 ppm to 10 ppm.

12. A microorganism foaming and bulking controlling method for waste water treatment, as recited in claim 5, wherein said polymer has a dose of 0.01 ppm to 10 ppm.

13. A microorganism foaming and bulking controlling method for waste water treatment, as recited in claim 6, wherein said polymer has a dose of 0.01 ppm to 10 ppm.

14. A microorganism foaming and bulking controlling method for waste water treatment, as recited in claim 2, wherein said polymer is injected or added by means of an addition system which comprises a polymer tank for storing said polymer, a mixing pump for pumping said polymer out of said polymer tank, a mixing tank for mixing and storing said polymer therein, a dosing pump for making a 0.01 to 10 ppm dose of said polymer for injecting in said waste water before entering said clarifier.

15. A microorganism foaming and bulking controlling method for waste water treatment, as recited in claim 3, wherein said polymer is injected or added by means of an addition system which comprises a polymer tank for storing said polymer, a mixing pump for pumping said polymer out of said polymer tank, a mixing tank for mixing and storing said polymer therein, a dosing pump for making a 0.01 to 10 ppm dose of said polymer for injecting in said waste water coming out of said aeration basin.

16. A microorganism foaming and bulking controlling method for waste water treatment, as recited in claim 5, wherein said polymer is injected or added by means of an addition system which comprises a polymer tank for storing said polymer, a mixing pump for pumping said polymer out of said polymer tank, a mixing tank for mixing and storing said polymer therein, a dosing pump for making a 0.01 to 10 ppm dose of said polymer for injecting in said aeration basin.

17. A microorganism foaming and bulking controlling method for waste water treatment, as recited in claim 6, wherein said polymer is injected or added by means of an addition system which comprises a polymer tank for storing said polymer, a mixing pump for pumping said polymer out of said polymer tank, a mixing tank for mixing and storing said polymer therein, a dosing pump for making a 0.01 to 10 ppm dose of said polymer for injecting at said return activated sludge (RAS) line.

* * * * *